United States Patent [19]

Quatrini et al.

[11] 4,353,879

[45] Oct. 12, 1982

[54] TUNGSTEN RECOVERY FROM TUNGSTEN ORE CONCENTRATES BY CAUSTIC DIGESTION

[75] Inventors: Lucretia R. Quatrini; Brice E. Martin, Towanda, both of Pa.

[73] Assignee: GTE Products Corporation, Stamford, Conn.

[21] Appl. No.: 261,409

[22] Filed: May 7, 1981

[51] Int. Cl.$^3$ .............................................. C01G 49/00
[52] U.S. Cl. ....................................... 423/53; 423/55; 423/58; 423/61; 423/593
[58] Field of Search ....................... 423/53, 55, 58, 61, 423/593

[56] References Cited

U.S. PATENT DOCUMENTS

| | | | |
|---|---|---|---|
| 2,339,888 | 1/1944 | Smith | 423/58 |
| 2,459,868 | 1/1949 | Burwell et al. | 423/58 |
| 3,800,025 | 3/1974 | Fox | 423/53 |
| 3,911,077 | 10/1975 | Martin et al. | 423/58 |

OTHER PUBLICATIONS

Vezina et al, "A Process for Preparing Tungstic Trioxide of High Purity from a Canadian Scheelite Concentrate", The Canadian Mining and Metallurgical Bulletin, Dec. 1966, pp. 1418–1422.

*Primary Examiner*—Earl C. Thomas
*Attorney, Agent, or Firm*—Robert E. Walter

[57] ABSTRACT

Tungsten is recovered from tungsten ore concentrates in the form of sodium tungstate by a basic process in which ground ore is first digested in a sodium hydroxide solution followed by diluting the solution to dissolve sodium tungstate separating the solution from the caustic insoluble sludge and crystallizing soluble sodium tungstate, wherein the present invention permits improved recovery of tungsten from difficult to process ores by the process steps of comminuting said tungsten ore concentrate to a particle size less than about 200 mesh, dispersing the comminuted ore to separate agglomerated particles, adding the dispersed ore to aqueous sodium hydroxide at a concentration of at least 10 molar and digesting at a temperature of from about 75° C. to 150° C. for a sufficient period of time to convert substantially all of the tungsten values to soluble sodium tungstate, and diluting the mixture to reduce the sodium hydroxide concentration to between about 4.5 and 5.5 molar at a temperature below about 90 degrees centigrade to substantially dissolve all of the sodium tungstate.

3 Claims, No Drawings

TUNGSTEN RECOVERY FROM TUNGSTEN ORE CONCENTRATES BY CAUSTIC DIGESTION

BACKGROUND

This invention relates to an improvement in a process to recover tungsten in a usable form and in high yields from tungsten ore concentrates which may, or may not, contain scheelite.

It is the practice to process tungsten ores by one of the following four conventional methods: acid decomposition, sodium carbonate digestion in autoclaves, fusion with sodium carbonate, and caustic digestion.

In acid decomposition, hydrochloric acid is normally employed to react with the calcium tungstate to produce tungsten acid and calcium chloride. Disadvantages of this method include a high consumption of hydrochloric acid (typically from one and a half to three moles of hydrochloric acid in excess of the stoichiometric amount are required), and yields only up to about 95%. Furthermore, since removal of molybdenum as a impurity requires a basic pH, acid decomposition is in general a more expensive process than basic processes for ores containing undesirably high molybdenum levels.

Sodium carbonate digestion in an autoclave produces soluble sodium tungstate and insoluble calcium carbonate. Disadvantages of this method include a relatively high consumption of sodium carbonate, and operation at elevated temperature and pressure (typically from 180° C. to 200° C. at 15 atmospheres).

Fusion with sodium carbonate involves the addition of sodium carbonate and silicon dioxide to the scheelite ore concentrate and reaction to produce soluble sodium tungstate, insoluble calcium silicate and carbon dioxide gas. Disadvantages of this technique are a large consumption of sodium carbonate, very high temperatures (above 1,000° C.) requiring expensive refractory materials, and the necessity for close control of the blend and temperature of reactants to obtain molten material which will flow from the reaction vessel.

U.S. Pat. No. 3,800,025 describes a lower temperature process applicable to low grade tungsten ores involving roasting in the presence of sodium carbonate or sodium phosphate and sodium chloride at between 600° C. and 900° C., followed by leaching and filtering. However, this process results in yields only up to about 85 percent.

Caustic soda digestion of scheelite involves the reaction of calcium tungstate and sodium hydroxide to obtain soluble sodium tungstate and insoluble calcium hydroxide according to the following reaction: $CaWO_4 + 2NaOH \rightarrow Na_2WO_4 + Ca(OH)_2$. In general this technique is characterized by high caustic requirements and poor yields of extracted tungsten values. For example, in one reported experiment as much as 4.4 grams of sodium hydroxide per gram of tungsten (18 moles in excess of the stoichiometric amount required) yielded only 86.3% of tungsten from a scheelite ore concentrate. *Canadian Mining and Metallurgical Bulletin*, December 1966, pages 1418-1422. In U.S. Pat. No. 2,339,888 from 3 to 5 times the stoichiometric amount of NaOH is used, during digestion at elevated temperatures. The caustic may be removed from crystallized molybdenum and tungsten and recycled for use in the digestion of additional ore. In U.S. Pat. No. 3,911,077 to Martin et al. tungsten is recovered by leaching the ore concentrate in a sodium hydroxide solution having a concentration of at least 10 molar at a temperature of from 90° C. to 150° C. to a moisture level of from 10 to 25 percent to convert the insoluble tungstates to sodium tungstate. The reduction in moisture level is achieved by a baking step during leaching.

As set forth in U.S. Pat. No. 2,339,888, hereinbefore mentioned, the caustic which liquor may be separated from crystallized sodium tungstate and sodium molybdate by filtration, and recycled after concentration for use in the digestion of additional ore. The recycled caustic which is the by-product of a hot filtering step is typically added to the digestion at temperatures of about 120° centigrade. The ores are charged during hot concentrated sodium hydroxide solution and digested to form the sodium tungstate.

SUMMARY OF THE INVENTION

Charging of tungsten ores of wolframite, ferberite or huebnerites results in a rapid conversion of the ore to sodium tungstate. These ores containing iron or manganese typically form small chunks of cement or agglomerates of a grit-like material which have unreacted tungsten at the core. The ores do not dissolve readily by conventional slurry techniques so that tungsten remains in the sludge as very small amounts of unreacted wolframite, ferberite or huebnerite encapsulated predominately by sodium tungstate. To increase the efficiency of tungsten recovered it is desirable to solubilize substantially all of the sodium tungstate.

A method for increasing the recovery of dissolved sodium tungstate from tungsten ore of the type which produce a sludge containing tungsten values when processed according to the steps of digesting said tungsten ore concentrate in concentrated sodium hydroxide to produce a mixture comprising soluble sodium tungstate and an insoluble sludge, diluting the mixture with water to form an aqueous portion containing dissolved sodium tungstate, separating the aqueous portion from the insoluble sludge portion and crystallizing sodium tungstate from the aqueous portion, the improvement comprising: comminuting said tungsten ore concentrate to a particle size less than about 200 mesh, dispursing the comminuted ore to separate agglomerated particles, adding the dispersed ore to aqueous sodium hydroxide at a concentration of at least 10 molar and digesting at a temperature of from about 75° C. to 150° C. for a sufficient period of time to convert substantially all of the tungsten values to soluble sodium tungsten, and diluting the mixture to reduce the sodium hydroxide concentration to between about 4.5 and 5.5 molar at a temperature below about 90 degrees centigrade to substantially dissolve all the sodium tungstate.

DETAILED DESCRIPTION

Calcium forms a tungstate mineral known as scheelite ($CaWO_4$). Calcium also form a tricalcium tungstate of the formula $Ca_3WO_6$. Iron and manganese form a range of tungstate minerals varying in composition between $FeWO_4$ and $MnWO_4$. These minerals are generally referred to as ferberite, wolframite and huebnerite, depending on the composition of the mineral. Generally, ferberite is used to describe such a mineral containing more than 20% by weight FeO and huebnerite is used when the mineral contains more than 20% by weight MnO. The intermediate compositions are referred to as wolframite, although this term is often used for the whole range of compositions.

In conventional processes for recovering tungsten values from tungsten ores, the ores are concentrated by gravity, magnetic and/or flotation techniques prior to chemical processing. The ore concentrates obtained by the above physical concentrating techniques can be highly variable in their composition.

According to a basic process of producing soluble sodium tungstate, the ore concentrate is digested in concentrated sodium hydroxide to produce a mixture comprising soluble sodium tungstate and an insoluble sludge. The mixture is next diluted to form an aqueous portion containing dissolved sodium tungstate which is separated from an insoluble sludge portion. Sodium tungstate is crystallized from the aqueous portion.

Although the scheelite ores can be processed according to the above process to convert substantially all of the tungsten values to soluble sodium tungstate, many ores, particularly ores of the wolframite, ferberite, or huebnerite variety may leave an insoluble sludge which may contain up to 4 percent by tungsten by weight. The present invention is directed to increasing the yield of dissolvable tungsten from those ores by improving the basic process.

The concentration of sodium hydroxide is critical during the digestion step in order to achieve the improved yields which are a particular advantage of the invention. During digestion the concentration should be at least 10 molar below which the efficiency of formation of sodium tungstate from calcium tungstate and sodium hydroxide is too low. While there is no upper limit to the concentration of the solution during digestion, concentrations above about 20 molar may require excessive volumes of water for subsequent dilution. Based upon these considerations, a concentration of at least about 15 molar of NaOH is preferred.

In order to maintain the aqueous portion of the digestion mixture in a liquid state during digestion, the sodium hydroxide should be present in an excess amount over that required for the reaction to proceed. It has been found that from about 6 to 17 moles of sodium hydroxide should be present per mole of tungsten, below which the aqueous portion of the digestion mixture tends to solidify during digestion, and above which the process tends to become uneconomical.

The digestion temperature may be from 75° C. to 150° C., below which the reaction proceeds too slowly and above which the slurry tends to solidify. It is preferred to digest within a temperature range of from about 100° to 145° C. in order to achieve an optimum through-put per unit of time. Where the particle size of the easily digested ore concentrate is greater than 98% below 200 mesh, digestion is usually substantially complete after about one half hour at the highest temperature of the above range to about 2 hours at the lowest temperature of the above range. More difficult to digest ores require digestion times on the order of 4 hours or greater to achieve complete digestion, since it is not desirable to interupt a continuous process by changing the digestion time depending on the ore, the process of the present invention permits the basic tungsten ore digestion process to run continuously with short digestion times while achieving high conversion of tungsten values in the ore to soluble sodium tungstate.

By dispersing the comminuted ore to separate agglomerated particles and adding the dispursed ore to the digestion mixture in accordance with the principles of the present invention, high yields of dissolved tungsten values may be obtained from difficult to digest ores with digestion times on the order or one-half hour at the highest temperature of the above mentioned range and about 2 hours at the lowest temperature of the above mentioned range.

The ore may be dispersed by a variety of techniques. According to one method, the ore may be slowly added so that the particles separate and remain separated as they fall into the digestion mixture. For more rapid additions, it is preferred to disperse the particles by feeding the particles through a screen. The screen separates the particles and permits the separated particles to fall into the digestion mixture.

According to another method, the ore particles may be entrained in a fluid and fed into the digestion mixture. When a gas is used as the fluidized medium, the solid particles are supported by drag forces caused by the gas phase passing through the interstices among the particles. When a liquid is utilized as the fluid, the mixture is characterized as non-colloidal containing free falling solids in a liquid-carrier. In the later case, it is preferred to maintain the liquid in a turbulent condition.

Following digestion, the resulting mixture comprising soluble sodium tungstate and insoluble sludge is diluted to reduce the concentration of sodium hydroxide to a level at which the sodium tungstate readily dissolves, that is, to a concentration below about 6 molar. Thus, soluble sodium tungstate is leached into the aqueous solution. While further dilution in general tends to increase the solubility of sodium tungstate in the leach solution, extreme dilution should in general be avoided since it ends to cause reversal of the digestion reaction and reformation of insoluble calcium tungstate. This tendency to reversal with decreasing concentration of sodium hydroxide decreases with decreasing temperature of the solution. For example, while at a solution temperature of about 90° C. reversal may occur within about four hours at a concentration of 3.5 molar, at a solution temperature of about 22° C. substantially no reversal occurs within this time period at a concentration of about two molar. In general, a dilution to within a range of 4.5 to 5.5 molar concentration of sodium hydroxide resulting in cooling to a temperature of about 80° to 90° C. allows up to about 28 hours before substantial reaction reversal begins. This is often advantageous in production operations where equipment for separation of the diluted leach solution from the sludge, (such as by filtration or decantation) is often not immediately available. Of course, it will be appreciated that after separation by filtration or decantation has been effected, the reversal problem is obviated. However, even where such separation may be carried out within a short time following leaching by dilution, it may be desirable to limit the extent of dilution of the leach solution where such solution is to be reconcentrated and recycled for digestion as described herein.

It has been found that the addition of at least about one mole of $Na_2SiO_3$ per mole of calcium to the diluted leach solution effectively retards reaction reversal. For example, for a digestion of 80 grams $WO_3$ in 150 ml of 50% (19.1 molar) NaOH solution, followed by dilution with 250 ml of $H_2O$, followed four hours after dilution by filtering to remove sludge, the addition of 1 mole $Na_2SiO_3$ per mole of Ca to the leach solution reduced the percent of original $WO_3$ remaining in the sludge from 23.4% to 0.4%.

The insoluble sludge is next separated from the aqueous portion of the diluted leach mixture. This may be any convenient method known in the art for separating liquids and solids such as decanting, filtration or centrifuging.

The aqueous portion of the diluted leach liquor is treated to effect the crystallization of sodium tungstate. The crystals of sodium tungstate are separated by any of the methods for effecting liquid-solid separation known in the art. Typical methods were hereinbefore discussed.

The aqueous solution containing excess sodium hydroxide which is separated from the crystals is concentrated to a concentration of about 6 to about 17 moles per liter by methods known in the art such as heating and/or evaporating the water content at a reduced pressure. The remaining aqueous portion which has been treated to concentrate the excess sodium hydroxide may be recycled to the digestion step for digesting additional tungsten ore.

EXAMPLE

Samples of wolframite ore containing 40 grams of $WO_3$ were charged over various lengths of time to hot 50% NaOH by various methods. Digestion was carried in 50% aqeuous solution of NaOH at 120°–150° C. for 3 hours. The mix is diluted with water to form an aqueous portion containing dissolved sodium tungstate. Experiments 1 and 2 show that when all other digestion conditions are constant, the method of charging the ore affects degree of tungsten recovery. In this case, charging the ore through a screen is superior to use of a batch additions. According to the batch charging, the total amount of ore charged is added in lots over a period of time. With the above samples the ore is charged by a spatula. Experiments 3 and 4 show that when all other digestion conditions are constant, the length of time of addition affects the degree of tungsten recovery. The longer addition time is superior.

| Expt No. | Initial Temp. of NaOH (°C.) | Method of Charging | Charging Time | Digestion Time | Method of Washing Sludge | $WO_3$ Level in Sludge (%) |
| --- | --- | --- | --- | --- | --- | --- |
| 1 | 82–83 | Batch | 12 Min. | 2 hr. | Hot $H_2O$ on Filter | 24.7 |
| 2 | 82–83 | ore screened | 12 Min. | 2 hr. | Hot $H_2O$ on filter | 8.5 |
| 3 | 80 | through 40 mesh Batch | 3 Min. | 3 hr. | Slurry in 4N NaOH | <0.5 |
| 4 | 80 | Batch | 1 Min. | 3 hr. | Slurry in 4N NaOH | 22.0 |

We claim:
1. A method for increasing the recovery of dissolved sodium tungstate from tungsten ore concentrate of the type which produce a sludge containing tungsten values when processed according to the steps of digesting said tungsten ore concentrate in concentrated sodium hydroxide to produce a mixture comprising soluble sodium tungstate and an insoluble sludge, diluting the mixture with water to form an aqueous portion containing dissolved sodium tungstate, separating the aqueous portion from the insoluble sludge portion and crystallizing soluble sodium tungstate from the aqueous portion, the improvement comprising: comminuting said tungsten ore concentrate to a particle size less than 200 mesh, dispersing the comminuted ore to separate agglomerated particles; adding the dispersed ore by permitting separated particles to fall into aqueous sodium hydroxide at a concentration of at least 10 molar to obtain a mole ratio of from about 6 to 17 moles of sodium hydroxide per mole of tungsten and digesting at a temperature of from about 75° C. to 150° C. for about one-half hour to about 2 hours to convert substantially all of the tungsten values to dissolvable sodium tungstate, and diluting the mixture to reduce the sodium hydroxide concentration to between about 4.5 and 5.5 molar at a temperature below about 90 degrees centigrade to substantially dissolve all the sodium tungstate.

2. A method according to claim 1 wherein digestion is carried out at temperature of from about 75° C. to about 145° C.

3. A method according to claim 2 wherein after crystallizing said sodium tungstate from the aqueous portion, said sodium tungstate crystals are separated from a remaining aqueous portion containing excess sodium hydroxide, said remaining portion is treated to concentrate said excess sodium hydroxide for digesting additional tungsten ore concentrate.

* * * * *